Figure 1:
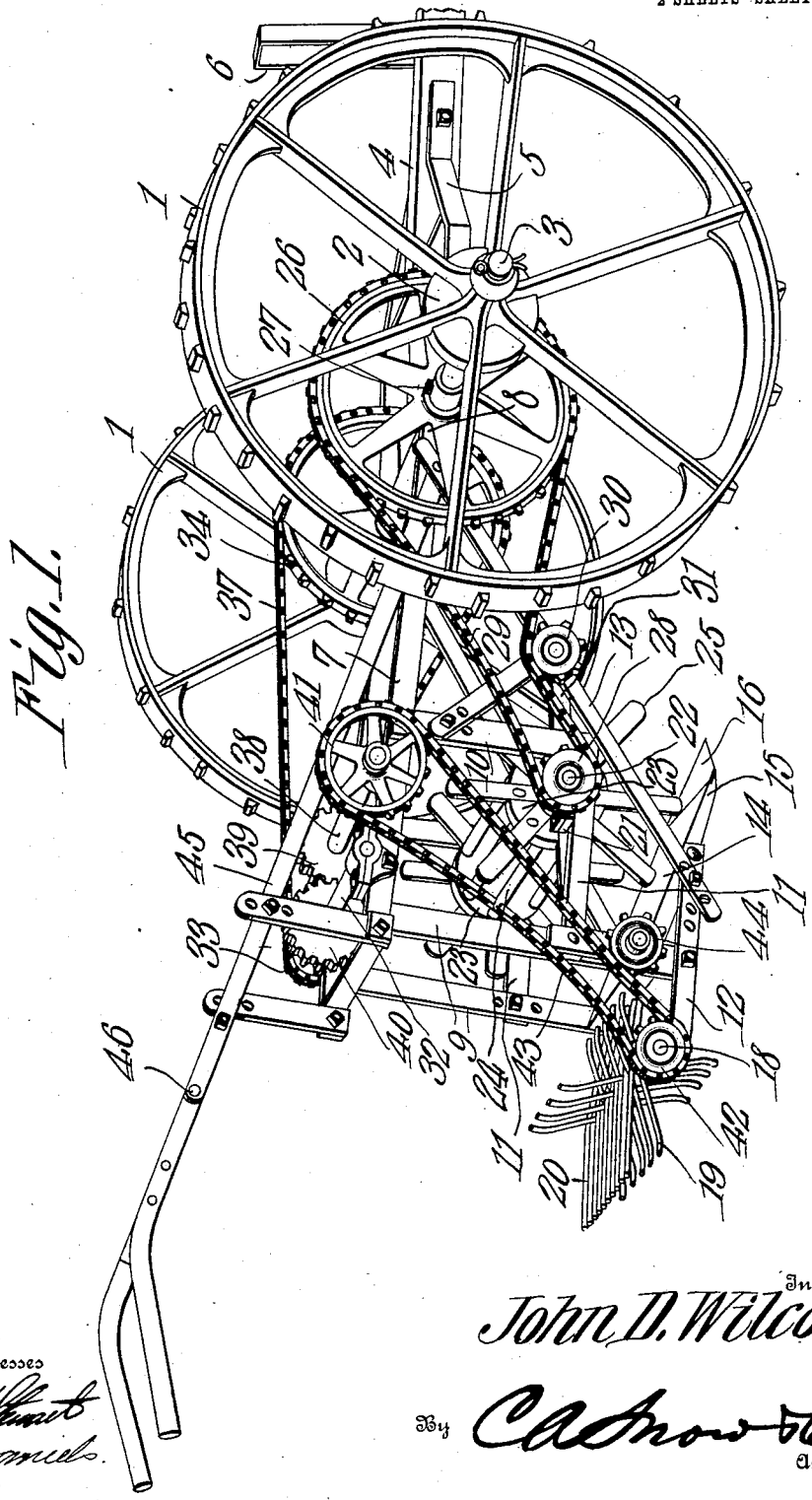

J. D. WILCOX.
POTATO DIGGER.
APPLICATION FILED NOV. 16, 1907.

912,344.

Patented Feb. 16, 1909.
2 SHEETS—SHEET 1.

Witnesses

Inventor
John D. Wilcox.
By C. A. Snow & Co
Attorneys

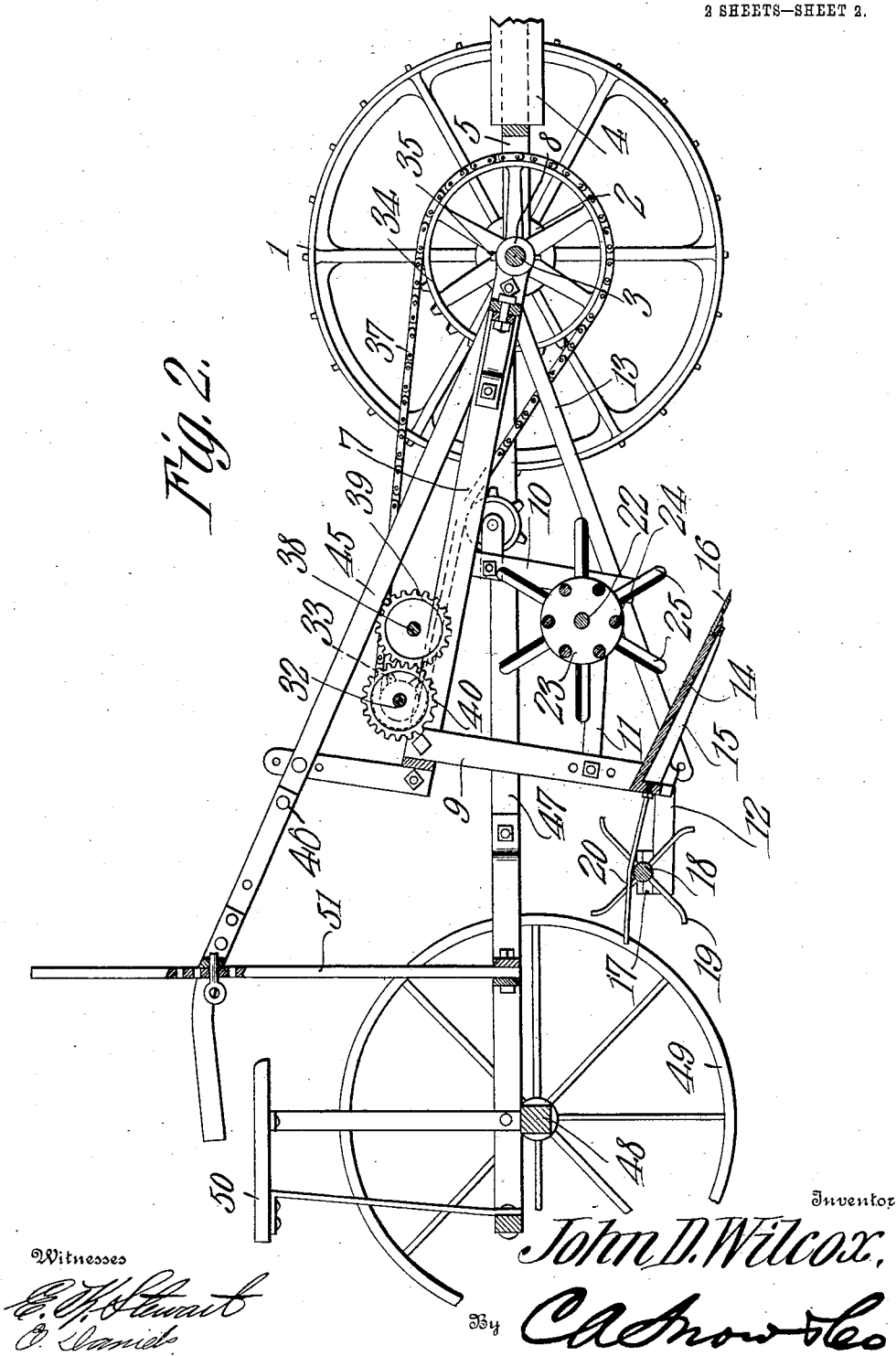

UNITED STATES PATENT OFFICE.

JOHN D. WILCOX, OF PINE CITY, MINNESOTA.

POTATO-DIGGER.

No. 912,344.     Specification of Letters Patent.     Patented Feb. 16, 1909.

Application filed November 16, 1907. Serial No. 402,522.

*To all whom it may concern:*

Be it known that I, JOHN D. WILCOX, a citizen of the United States, residing at Pine City, in the county of Pine and State of Minnesota, have invented a new and useful Potato-Digger, of which the following is a specification.

This invention has relation to potato diggers and it consists in the novel construction and arrangement of its parts as hereinafter shown and described.

The object of the invention is to provide a potato digger of simple and durable construction the parts of which are so assembled that the implement may be used in close proximity to fences or other fixed objects and also may describe comparatively short turns at the ends of the rows of plants.

The digger may be used as what is termed a walking implement or one wherein the operator follows behind the same on foot or it may be used in connection with a sulky attachment upon which the operator may ride, in which case the digger is converted into a straddle row riding implement.

The implement consists primarily of a wheel mounted axle which rotates with the wheels when they turn in a forward direction but which remains stationary when the said wheels turn rearwardly. A frame is pivotally attached to the said axle and carries an adjustable rotating vine packer which is provided at its ends with actiniform blades. A shovel is carried by said frame in the rear of the vine packer and a series of sifting arms is located behind the said shovel. A rotating potato casting means operates in the spaces between the sifting arms. The said rotating parts are operatively connected with the said axle from which they derive their movement.

Figure 1 is a perspective view of the digger, and Fig. 2 is a longitudinal sectional view of the same.

The digger has the supporting wheels 1 which are provided with the pawl and ratchet hubs 2. The axle 3 is supported by the wheels 1 and the said pawl and ratchet hubs form an escapement for the axle whereby the same is caused to rotate with the said wheels when they turn in a forward direction but which remains stationary when the said wheels turn rearwardly. The tongue 4 is connected by mean of the hounds 5 with the said axle. The said axle is journaled in the rear ends of the said hounds. The post 6 is erected upon the rear portion of the tongue 4.

A frame is pivotally connected at its forward ends to the axle 3. Said frame consists of the side bars 7 which are provided at their forward ends with bearings 8 which receive the axle 3. The bars 9 depend from the rear ends of the bars 7 and the intermediate bars 10 depend from the middle portions of the bars 7. The bars 11 are pivoted at their forward ends to the bars 10 and are adjustably attached at their rear ends to the bars 9 whereby the said rear ends of the bars 11 may be swung vertically and attached to the bars 9 in adjusted positions. The bars 12 are pivotally attached at intermediate points to the lower ends of the bars 9. The braces 13 are pivotally attached at their forward ends to the forward portion of the bars 7 and are adjustably attached at their rear ends to the bars 12. The casting 14 is secured at its edges to the bars 12. Said casting is provided with an upper plane surface and upon its lower side is provided with the depending flanges 15 which extend in the line of draft of the implement and brace the casting. A detachable plate 16 is mounted upon the casting 14. The bars 12 are provided at their rear ends with the bearings 17 in which is journaled a shaft 18. The actiniform arms 19 are mounted upon the shaft 18 and are slightly curved longitudinally. The sifting arms 20 are attached at their forward end to the rear edge of the casting 14 and extend rearwardly and upwardly and are spaced apart. The arms 19 move in the spaces between the arms 20 as the shaft 18 is revolved as will be hereinafter explained. The bearings 21 are mounted upon the forward portions of the bars 11 and the shaft 22 is journaled for rotation in the said bearings. The disks 23 are mounted upon the shaft 22 and are connected together at their peripheries by the horizontal spaced vine packing rods 24. The actiniform blades 25 are mounted upon the disks 23.

The packing mechanism just described is located in advance of and slightly above the digging mechanism which consists of the casting 14 and the plate 16. The sprocket wheel 26 is fixed to the axle 3 by means of a pin 27 which passes transversely through the hub of the said sprocket wheel and the said axle. The sprocket wheel 28 is attached to the shaft 22 and the sprocket chain 29 passes around the sprocket wheel 26 and 28. Said chain must have some slack and the lower portion of the chain is held up by a loose sprocket wheel 30 which is journaled in a bracket 31 carried by one of the bars 10. The shaft 32 is journaled for rotation at the rear portions of the side bars 7 and is provided at one end with a sprocket wheel 33. The sprocket wheel 34 is fixed to the axle 3 by means of a pin 35 which passes transversely through the hub of the sprocket wheel and the axle 3. The sprocket chain 37 passes around the sprocket wheels 33 and 34. The counter shaft 38 is journaled for rotation upon the bars 7 in advance of the shaft 32 and carries a gear wheel 39 which meshes with the gear wheel 40 mounted upon the shaft 32. The sprocket wheel 41 is fixed to the end of the counter shaft 38 and the sprocket wheel 42 is fixed to the end of the shaft 18. The sprocket chain 43 passes around the wheels 41 and 42. By reason of the fact that the bars 12 may be adjusted upon their pivot the chain 43 must have some slack and the lower portion of the said chain is prevented from bowing down by the idle sprocket wheel 44 which is journaled to one of the bars 9 and supports the lower portion of the said chain 43. The handles 45 are supported upon the side bars 7 and are made in sections connected together by the break joints 46 whereby the upper extremities of the said handles may be swung down upon the lower portions thereof when desired.

A sulky attachment is provided for the implement which consists of the thills 47 which are adapted to be connected at their forward ends to the axle 3 and which are supported at their rear ends upon the axle 48 which in turn is mounted upon the ground wheels 49. The seat 50 is supported by the axle 48 as is also the upright 51.

The operation of the implement is as follows: As it is drawn along the ground and the wheels 1 turn in a forward direction the axle 3 is correspondingly rotated which carries around with it the sprocket wheels 26 and 34. Through the sprocket wheel 26, chain 29 and sprocket wheel 28 the shaft 22, disks 23, rods 24 and blades 25 are rotated in the same direction as that in which the axle 3 is turning. The rods 24 pack the vines against the surface of the ground while the blades 25 cut the vines and weeds at the edges of the rows of potatoes and prevent the outlying portions of the said vines and weeds from becoming entangled in the mechanism of the implement. Through the sprocket wheel 34, chain 37 and sprocket wheel 33 the shaft 32 is rotated in the same direction as that in which the axle 3 is turning but through the gear wheels 40 and 39 the shaft 38 is rotated in the opposite direction. Through the sprocket wheel 41, chain 43 and sprocket wheel 42 the shaft 18 is rotated which carries around the arms 19 in the spaces between the arms 20. In the mean time the plate 16 and casting 14 are moving under the potatoes in the row and shunting them back together with some earth toward the arms 20. The earth and smaller potatoes fall through the spaces between the arms 20 while the larger potatoes are caught up by the arms 19 and are cast rearwardly and deposited upon the surface of the ground and upon the vines which have been previously compressed by the vine packer. By reason of the fact that the potatoes are heavier and of greater diameter than the vines they are more positively acted upon by the casting arms and consequently are thrown further which will leave the vines in the furrow and the potatoes on top of the vines. By adjusting the rear ends of the bars 11 the vine packer and blades 25 may be adjusted to or away from the surface of the ground whereby the said packer may operate at any desired distance above the ground and the said blade may operate at any desired depth in the soil. By adjusting the lower ends of the braces 13 along the bars 12 the said bars may be pitched at any desired angle which will dispose the casting 14 and plate 16 in proper position with relation to the potatoes in the ground.

When it is desired to throw the moving parts of the implement out of gear with the axle 3 the pins 27 and 35 are removed from the hubs of the sprocket wheels 26 and 34 respectively. When it is desired to transport the implement from place to place the entire frame is swung over the axle 3 so that either one of the shafts 32 or 38 will rest upon the post 6. When this is done the ends of the handles 45 are swung upon the break joints 46 so that the outer portions of the said handle will be doubled against the inner portions thereof in compact relation. When the sulky attachment is used in combination with the implement the plate 16 may be caused to operate at a desired distance below the surface of the soil by adjustably attaching the handles 45 or round carried thereby to the upright 51 mounted upon the thills 47.

Having described my invention what I claim as new and desire to secure by Letters-Patent is:—

1. In a potato digger a vine-packer comprising a shaft, spaced disks thereon and constituting heads, straight rods extending through and secured to the heads, said rods being spaced apart and parallel, and cutting blades radiating from each head.

2. In a potato digger, a wheel-supported structure, a frame pivotally mounted thereon and disposed to swing vertically relative thereto, a vine packer carried by the frame and comprising a shaft, spaced disks on the shaft and constituting heads, straight rods extending through and secured to the heads, said rods being spaced apart and parallel, and cutting blades radiating from each head, and fixed means upon the wheel-supported structure for supporting the pivoted frame and the vine packer out of operative position.

In testimony that I claim the foregoing as my own, I have hereto affixed my signature in the presence of two witnesses.

JOHN D. WILCOX.

Witnesses:
 Mrs. Eugene Barnum,
 Dave Fortier.